(12) United States Patent
Pyo (10) Patent No.: US 12,386,019 B2
(45) Date of Patent: Aug. 12, 2025

(54) RADAR SIGNAL PROCESSING DEVICE, METHOD AND SYSTEM

(71) Applicant: HL Klemove Corp., Incheon (KR)

(72) Inventor: Eunjong Pyo, Seoul (KR)

(73) Assignee: HL Klemove Corp., Incheon (KR)

( * ) Notice: Subject to any disclaimer, the term of this patent is extended or adjusted under 35 U.S.C. 154(b) by 325 days.

(21) Appl. No.: 17/994,641

(22) Filed: Nov. 28, 2022

(65) Prior Publication Data

US 2023/0314552 A1    Oct. 5, 2023

(30) Foreign Application Priority Data

Apr. 5, 2022    (KR) .......................... 10-2022-0042108

(51) Int. Cl.
*G01S 5/02*    (2010.01)
*G01S 7/40*    (2006.01)

(52) U.S. Cl.
CPC .......... *G01S 5/0284* (2013.01); *G01S 7/4021* (2013.01)

(58) Field of Classification Search
CPC ...... G01S 13/582; G01S 13/584; G01S 13/87; G01S 13/931; G01S 5/0284; G01S 7/003; G01S 7/4021; G01S 7/41
See application file for complete search history.

(56) References Cited

U.S. PATENT DOCUMENTS

| 2021/0208236 A1* | 7/2021 | John Wilson | G07C 5/008 |
| 2021/0294278 A1* | 9/2021 | Nguyen | G06N 3/088 |
| 2023/0204721 A1* | 6/2023 | Meyer | G01S 7/417 |
| | | | 342/195 |

FOREIGN PATENT DOCUMENTS

| JP | 2021-514508 A | 6/2021 |
| KR | 10-2317856 B1 | 10/2021 |

OTHER PUBLICATIONS

Office Action issued in Korean Patent Application No. 10-2022-0042108 dated Dec. 18, 2024.

* cited by examiner

*Primary Examiner* — Timothy X Pham (74) *Attorney, Agent, or Firm* — Harvest IP Law, LLP (57) ABSTRACT

The embodiments relate to a radar signal processing device, method and system. Specifically, a radar signal processing device according to the embodiments may include a receiver for receiving first sensing data from a first radar, and a controller configured to decode the first sensing data using an auto-encoder method, classify objects around a vehicle based on the decoded first sensing data, and track the object.

14 Claims, 5 Drawing Sheets

RADAR SIGNAL PROCESSING DEVICE, METHOD AND SYSTEM

CROSS REFERENCE TO RELATED APPLICATION

This application claims priority from Korean Patent Application No. 10-2022-0042108, filed on Apr. 5, 2022, which is hereby incorporated by reference for all purposes as if fully set forth herein.

TECHNICAL FIELD

The embodiments of the present disclosure relate to a radar signal processing device, method and system for processing a radar signal.

Recently, the number of vehicles equipped with radar is increasing. An electronic control unit of the vehicle may calculate a distance, a relative speed and an angle between the host vehicle and an object around the host vehicle based on the information output from the radar mounted on the vehicle.

The vehicle equipped with a radar may provide various safety functions or convenience functions by using the distance, the relative speed and the angle between the host vehicle and an object around the host vehicle.

However, since the radar mounted on the vehicle has the characteristic of continuously detecting the surroundings and outputting the result, the radar may have a limitation of outputting only information about a limited number of objects. Therefore, in the case that a lot of objects exist in the vicinity of the vehicle, there is a limitation in providing the vehicle with the aforementioned safety function or convenience function, so that there is a demand for solving this limitation.

SUMMARY

In this background, an object of the present disclosure is to provide a radar control device and method for receiving a reception signal from a radar and processing data by applying an auto encoding method to the reception signal.

In an aspect of the present disclosure, there is provided a radar signal processing device including a receiver configured to receive first sensing data from a first radar, and a controller configured to decode the first sensing data using an auto-encoder method, classify objects around a vehicle based on the decoded first sensing data, and track the object.

In another aspect of the present disclosure, there is provided a radar signal processing method including receiving first sensing data from a first radar, decoding the first sensing data using an auto-encoder method, and classifying objects around a vehicle based on the decoded first sensing data and tracking the object.

In another aspect of the present disclosure, there is provided a radar signal processing system including a first radar for detecting surroundings of a vehicle and generating first sensing data, and a radar signal processing device configured to receive the first sensing data from the first radar, decode the first sensing data using an auto-encoder method, classify objects around a vehicle based on the decoded first sensing data, and track the object.

The radar signal processing device, method and system according to embodiments may be technologies that enable the application of high-performance signal processing techniques by effectively compressing or encoding data and transmitting it to the vehicle central processor in a limited vehicle system. Furthermore, the radar signal processing device, method and system according to embodiments may fusion the data of the radar, which only transmits the target information of the limited target, as raw data.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described an embodiment of the radar signal processing system 1 capable of performing the function of the radar signal processing device 10 and performing the function of controlling the radar 20.

Figure 1:
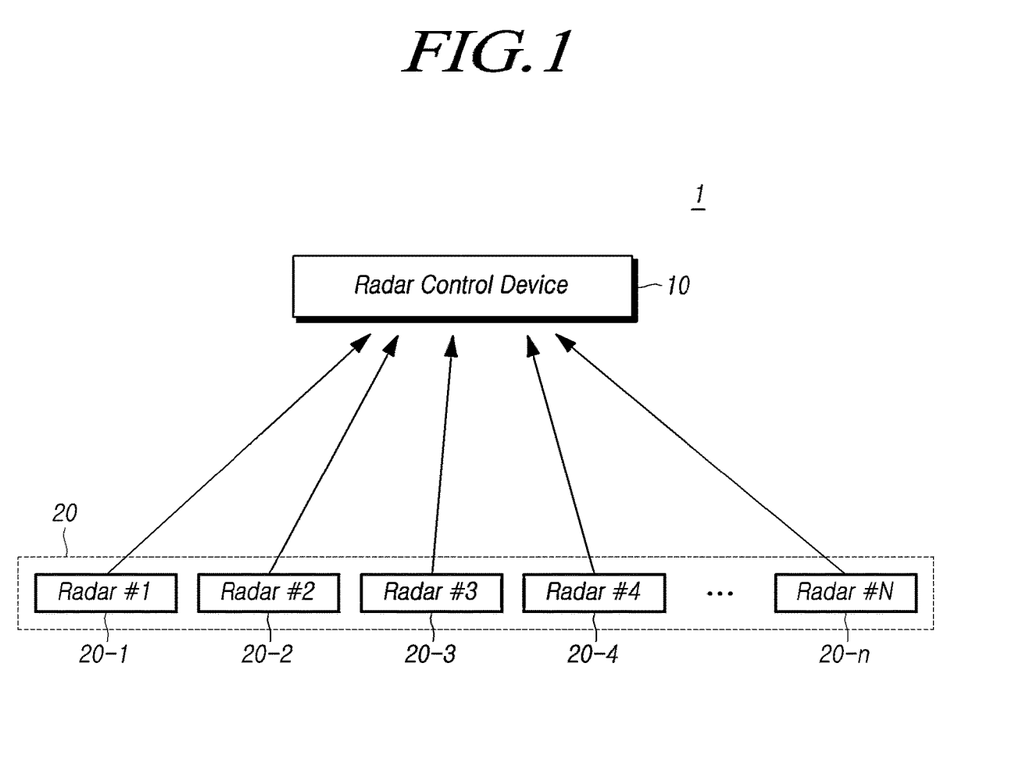
FIG. 1 is a block diagram illustrating a radar signal processing system according to an embodiment of the present disclosure.

FIG. 1 is a block diagram illustrating a radar signal processing system according to an embodiment of the present disclosure.

Referring to FIG. 1, a radar signal processing system 10 may include a radar signal processing device 10 and a radar 20, and the like. In one embodiment, the radar 20 may consist of N radars. Here, N may be a natural number greater than 1.

The radar signal processing system 1 may be mounted on a vehicle and process sensing data detected by the radar 20 to classify objects detected around the vehicle.

For example, in the case that the radar 20 is configured as one, the radar signal processing system 1 may include a radar signal processing device 10 which receives first sensing data from a first radar 20-1 for generating the first sensing data by detecting the surroundings of the vehicle, decodes the first sensing data in an auto-encoder method, classifies objects around the vehicle based on the decoded first sensing data, and tracks the object. In the present disclosure, encoding and decoding of data may be used in the same meaning as compression and decompression of data.

Here, the first sensing data may include range-Doppler 2D data on which a Fast Fourier Transform (FFT) is performed on the reception signal. In addition, the first sensing data may be a result of encoding or compressing of the range-Doppler 2D data using an auto-encoder method.

If the radar 20 is configured in plurality, the radar signal processing system 1 may further include a second radar 20-2 which detects the surroundings of the vehicle and generates second sensing data. The radar signal processing device 10 may receive the second sensing data, decode the second sensing data using an auto-encoder method, and classify objects around the vehicle based on the first sensing data and the second sensing data.

The radar signal processing system 1 according to an embodiment of the present disclosure may be an advanced driver assistance systems (ADAS) which provides information to assist the driving of the host vehicle or provides assistance to the driver in controlling the host vehicle.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

The radar 20 may generate sensing data by detecting the surroundings of the vehicle. In addition, in the case of a plurality of radars 20, each of the radars 20-1, 20-2, 20-3, ..., 20-n may generate sensing data that is a result of the detection within a detection range depending on a mounted position, respectively.

Specifically, each of the radars 20-1, 20-2, 20-3, ..., 20-n may include an antenna unit, a radar transmitter, and a radar receiver.

The antenna unit may include one or more transmission antennas and one or more receiving antennas, and each transmission/receiving antenna may be an array antenna in which one or more radiating elements are connected in series by a feed line, but is not limited thereto.

The antenna unit may include a plurality of transmission antennas and a plurality of receiving antennas, and may have various types of antenna array structures according to an arrangement order and an arrangement interval thereof.

The radar transmitter may provide a function of transmitting a transmission signal through a switched transmission antenna by switching to one of a plurality of transmission antennas included in the antenna unit or transmitting a transmission signal through a multi-transmission channel allocated to the plurality of transmission antennas. For example, a Fast Frequency Modulated CW Radar (FMCW) ramp signal may be generated and transmitted.

The radar transmitter may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The radar receiver may receive a reception signal received by being reflected from an object through a receiving antenna.

In addition, the radar receiver may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The radar receiver may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

The radar 20 may transmit the sensing data generated by performing Fast Fourier Transform (FFT) on the received data to the radar signal processing device.

The sensing data may be encoded or compressed in an auto-encoder method for smooth transmission.

Here, the encoding and decoding in the auto-encoder method may be one of techniques using an artificial neural network of an unsupervised learning model trained in an unsupervised method. In the auto-encoder method, it is possible to first learn a compressed (or encoded) representation on data, and then generate input data from the learned and compressed (or encoded) representation. The encoding of the sensing data according to the auto-encoder method may be performed by a processing module such as a microcontroller unit (MCU) included in the radar, or a separate auto-encoder device may be mounted thereon.

The radar 20 may encode the sensing data in an auto-encoder method, thereby compressing the sensing data having a relatively large capacity into a small capacity and efficiently transmitting the sensing data to the radar signal processing device 10.

Figure 2:
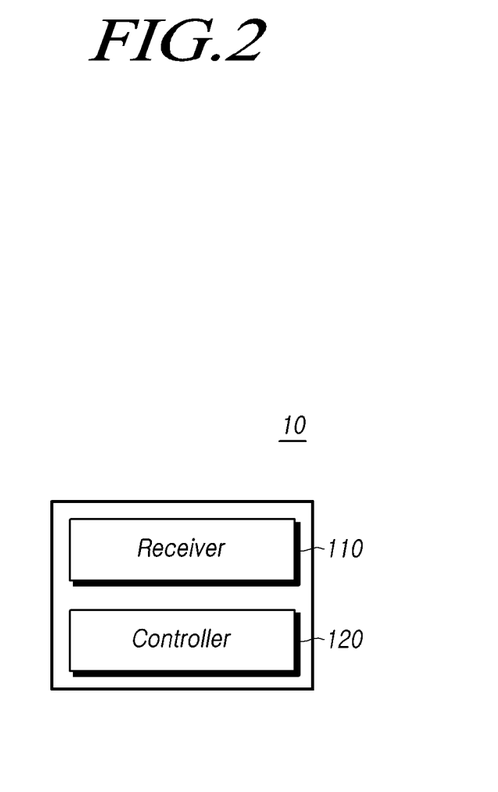
FIG. 2 is a block diagram schematically illustrating a radar signal processing device according to an embodiment of the present disclosure.

FIG. 2 is a block diagram schematically illustrating a radar signal processing device according to an embodiment of the present disclosure.

Referring to FIG. 2, the radar signal processing device 10 may include a receiver 110 and a controller 120.

The receiver 110 may receive the first sensing data from the first radar 20-1. In the case that a plurality of radars 20 are mounted on a vehicle, each of the sensing data may be received from each of the plurality of radars 20. For example, if two radars 20 are mounted, the receiver 110 may receive the first sensing data from the first radar 20-1 and the second sensing data from the second radar 20-2.

The receiver 110 may receive the first sensing data from the first radar 20-1 through a controller area network (CAN). The receiver 110 may receive the first sensing data using a vehicle network other than CAN. The vehicle network may further include, for example, Ethernet, SerDes, and the like.

The controller 120 may decode the first sensing data in an auto-encoder method, classify objects around the vehicle based on the decoded first sensing data, and track the object.

Figure 3:
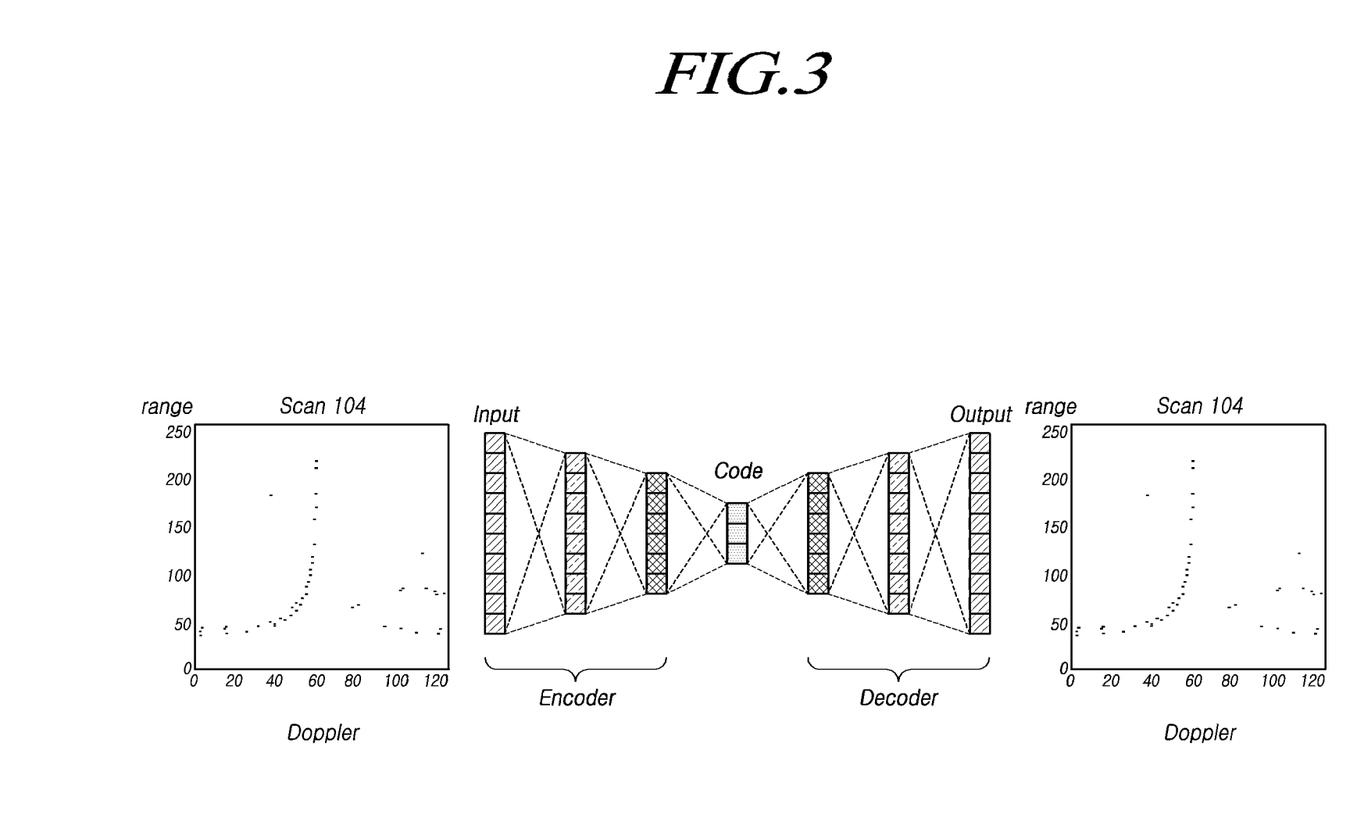
FIGS. 3 and 4 are diagrams for explaining encoding and decoding of sensing data using an auto-encoder method, according to an embodiment.
Figure 4:
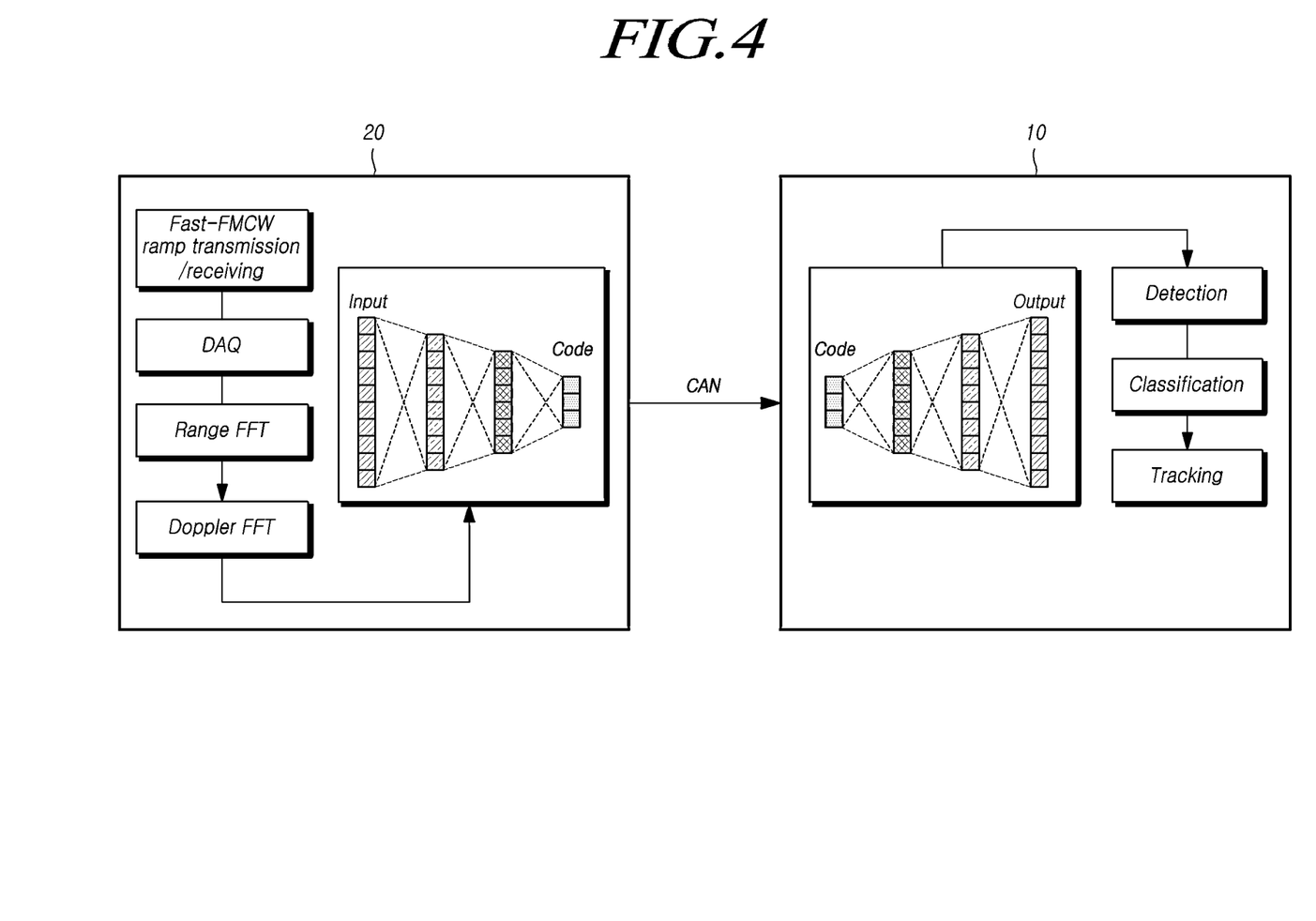

FIGS. 3 and 4 are diagrams for explaining encoding and decoding of sensing data using an auto-encoder method, according to an embodiment.

In general, the radar 20 may classify and track an object by using its own processing unit for sensing data. However, the processing performance of the processing device of the radar 20 is not sufficient to classify and track all objects by processing the sensing data.

That is, the general radar 20 can classify and track a limited object.

According to embodiments of the present disclosure, there may be provided the radar signal processing device 10 as a processing unit having a higher processing capability than the general radar 20, thereby receiving and processing the sensing data of the radar 20 to classify and track more objects.

In addition, If the sensing data having a large capacity is transmitted to the radar signal processing device, the classification and tracking time of the object may be delayed due to the delayed transmission time.

Therefore, referring to FIG. 3, the radar 20 may encode and transmit sensing data in an auto-encoder method when transmitting the sensing data to the radar signal processing device 10.

For example, as shown in FIG. 3, the radar 20 may encode input data, which is an unlabeled data-set, according to a loss function and an optimization function defined in the auto-encoder method, and generate the sensing data which is the encoded data(Code) and transmit to the radar signal processing device 10. The radar signal processing device 10 may generate an output obtained by reconstructing input data by performing auto-encoder decoding on the received sensing data.

That is, if the controller 120 decode the sensing data, it is possible to receive substantially the same data as the sensing data before encoding.

Referring to FIG. 4, the radar 20 may collect (i.e., DAQ, Data acquisition) received data calculated by transmitting and receiving a signal in the Fast FMCW Ramp method.

In addition, the radar 20 may perform a Fast Fourier Transform (FFT) on the received data to compress and transmit the result.

Specifically, the radar 20 may convert the received data into a range-time domain by performing a first FFT with respect to a frequency, and generate range-Doppler FFT data by performing a second FFT with respect to time and transforming it into a range-Doppler domain. FIG. 3 illustrates a range-Doppler FFT 2D map transformed by FFT That is, the first sensing data received from the first radar 20-1 may include range-Doppler 2D data which is a data on which FFT is performed for the reception signal. In addition, the first sensing data may be a result of encoding of the range-Doppler 2D data using an auto-encoder method.

In an embodiment, the first sensing data may be a result of compressing or encoding 1D FFT data, which is data before the Range-Doppler 2D data processing step, by an auto-encoder method, or a result of compressing or encoding ADC data, which is data before processing the 1D FFT data, by an auto-encoder method. That is, the target of encoding may be not limited to range-Doppler 2D data.

In an embodiment, the radar 20 may encode the collected received data and transmit it to the receiver 110. In this case, the controller 120 may decode the received data and perform an FFT on the received data to determine the range-Doppler 2D data. However, the range-Doppler 2D data may be quickly calculated even with the radar 20 having a relatively low processing capability. In addition, if there are a plurality of radars 20, since the controller 120 has to process each of the plurality of received data, the efficiency of signal processing of the radar 20 may be reduced.

Therefore, each radar 20 may determine the range-Doppler 2D data, encode it and transmit the sensing data, so that the radar 20 signal processing efficiency may be improved.

The controller 120 may decode the sensing data in an auto-encoder method.

The controller 120 may perform a detection process for classifying an object based on the decoded sensing data. Specifically, the controller 120 may extract effective data from the sensing data in consideration of the reception power of the radar cross section (RCS) of the radar 20 of the sensing data.

The controller 120 may classify objects based on the extracted valid data. In addition, the controller 120 may track the classified object. The controller 120 may track the object in consideration of the sensing data received in the current scan period of the radar 20 and the sensing data received in the previous scan period.

In addition, the controller 120 may detect an abnormality of the radar 20 based on the received sensing data. For example, the controller 120 may detect whether the mounting angle of the radar 20 is misaligned or whether of a radar blockage of the radar 20 based on the sensing data.

When receiving a plurality of sensing data, the controller 120 may decode the second sensing data in an auto-encoder method, and classify objects around the vehicle based on the first sensing data and the second sensing data. The controller 120 may integrate the first sensing data and the second sensing data to extract valid data based on the integrated sensing data, classify the objects, track the object, and detect an abnormal phenomenon of the radar 20.

When receiving a plurality of sensing data, the controller 120 may classify and track objects around the vehicle based on the sensing data of the same sensor period. For example, as shown in FIG. 3, the range-Doppler FFT 2D map may mean the first sensing data of the first radar 20-1 calculated in the 104-th scan period. In this case, if the controller 120 classifies objects by using the second sensing data from the second radar 20-2, the second sensing data calculated in the 104-th scan period may be used.

That is, the controller 120 may classify and track objects around the vehicle by using the sensing data based on a signal transmitted and received at the same time point.

Accordingly, the controller 120 may adjust the scan period of the radar 20 to match the output synchronization of the radar signal processing system 1.

In addition, the controller 120 may implement a multi-sensor fusion for detecting a surrounding object by further considering image data from an image sensor such as a camera or LiDAR. In addition, the controller 120 may control the vehicle by further considering the state of the vehicle, the driving situation, the steering of the vehicle, and the like by using a plurality of sensors.

As described above, the radar signal processing device 10 of the present disclosure may classify and track more objects by processing sensing data with better processing performance.

In a embodiment, the radar signal processing device may be implemented as an electronic control unit (ECU), a microcomputer, a domain control unit, or the like. For example, a domain control unit of the radar signal processing device 10 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the radar signal processing device 10 according to the present embodiment, and the receiver 110 and the controller 120 included therein may be implemented as a control device of a sensor system of a vehicle or as a module of an ECU.

The control device or ECU of such a sensor system may include a processor, a storage device such as a memory, and a computer program capable of performing a specific function. In addition, the receiver 110 and the controller 120 may be implemented as software modules capable of performing respective corresponding functions.

That is, the receiver 110 and the controller 120 according to the present embodiment may be implemented as respective software modules and stored in a memory, and each software module may be executed at a specific time point in an arithmetic processing unit such as an ECU included in the radar system.

Hereinafter, it will be described a radar control method using the radar signal processing device 10 capable of performing all of the above-described present disclosure.

Figure 5:
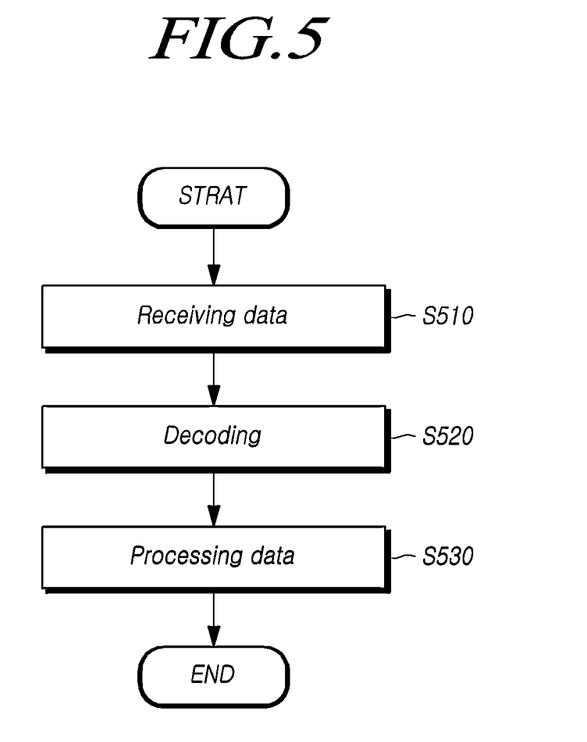
FIG. 5 is a flowchart illustrating a radar signal processing method according to an embodiment of the present disclosure.

FIG. 5 is a flowchart illustrating a radar signal processing method according to an embodiment of the present disclosure.

Referring to FIG. 5, the radar signal processing method according to an embodiment of the present disclosure may include a data receiving step of receiving first sensing data from a first radar 20-1 (S510), a decoding step of decoding the first sensing data through an auto-encoder method (S520), and a data processing step of classifying objects around the vehicle based on the decoded first sensing data and tracking the object (S530).

Here, the sensing data may include range-Doppler 2D data which is a data on which Fast Fourier Transform (FFT) is performed on the reception signal. In addition, the sensing data may be a result of encoding of the range-Doppler 2D data through an auto-encoder method.

In the data receiving step S510, the second sensing data may be further received from the second radar 20-2, and in the data processing step S530, the second sensing data may be decoded by an auto-encoder method, the objects around the vehicle may be classified based on the first sensing data and the second sensing data.

In the case that there are a plurality of radars 20 mounted on a vehicle, the radar signal processing device 10 may receive respective sensing data from all of the radars 20 mounted on the vehicle, classify the objects by using all of the sensing data, and track the objects.

In the data receiving step S510, the first sensing data may be received from the first radar 20-1 through a vehicle network including a controller area network (CAN).

In the data processing step S530, the objects around the vehicle may be classified based on the sensing data of the same sensor period.

As described above, the radar signal processing device, method and system according to embodiments may be technologies that enable the application of high-performance signal processing techniques by effectively compressing or encoding data and transmitting it to the vehicle central processor in a limited vehicle system. Furthermore, the radar signal processing device, method and system according to embodiments may fusion the data of the radar, which only transmits the target information of the limited target, as raw data.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar signal processing device comprising:
   a receiver configured to receive first sensing data from a first radar; and
   a controller configured to decode the first sensing data using an auto-encoder method, classify objects around a vehicle based on the decoded first sensing data, and track the objects,
   wherein, when the receiver receives a plurality of sensing data from a plurality of radars, the controller classifies and tracks the objects based on sensing data, among the plurality of sensing data, corresponding to a same sensor period,
   wherein the controller adjusts a scan period of the first radar to match an output synchronization of the radar signal processing device,
   wherein the controller detects an abnormality of the first radar including a misalignment or a blockage of the first radar based on the decoded first sensing data.

2. The radar signal processing device of claim 1, wherein the first sensing data comprises range-Doppler 2D data, which is data on which Fast Fourier Transform (FFT) is performed on a reception signal.

3. The radar signal processing device of claim 2, wherein the first sensing data is a result of encoding the range-Doppler 2D data using an auto-encoder method.

4. The radar signal processing device of claim 1, wherein the receiver further receives second sensing data from a second radar, and the controller decodes the second sensing data using an auto-encoder method and classifies objects around the vehicle based on the first sensing data and the second sensing data.

5. The radar signal processing device of claim 1, wherein the receiver receives the first sensing data from the radar through a controller area network (CAN).

6. A radar signal processing method comprising:
receiving first sensing data from a first radar;
decoding the first sensing data using an auto-encoder method;
classifying objects around a vehicle based on the decoded first sensing data and tracking the objects,
adjusting a scan period of the first radar to match an output synchronization of a radar signal processing device; and
detecting an abnormality of the first radar including a misalignment or a blockage of the first radar based on the decoded first sensing data,
wherein, when a receiver receives a plurality of sensing data from a plurality of radars, the classifying includes classifying the objects based on sensing data, among the plurality of sensing data, corresponding to a same sensor period.

7. The radar signal processing method of claim 6, wherein the first sensing data comprises range-Doppler 2D data, which is data on which Fast Fourier Transform (FFT) is performed on a reception signal.

8. The radar signal processing method of claim 7, wherein the first sensing data is a result of encoding the range-Doppler 2D data using an auto-encoder method.

9. The radar signal processing method of claim 6, further comprising receiving second sensing data from a second radar and decoding the second sensing data using an auto-encoder method,
wherein the classifying objects comprises classifying objects around the vehicle based on the first sensing data and the second sensing data.

10. The radar signal processing method of claim 6, wherein the receiving comprises receiving the first sensing data from the radar through a controller area network (CAN).

11. A radar signal processing system comprising:
a first radar for detecting surroundings of a vehicle and generating first sensing data; and
a radar signal processing device configured to receive the first sensing data from the first radar, decode the first sensing data using an auto-encoder method, classify objects around a vehicle based on the decoded first sensing data, and track the objects,
wherein, when receiving a plurality of sensing data from a plurality of radars, the radar signal processing device classifies and tracks the objects based on sensing data, among the plurality of sensing data, corresponding to a same sensor period,
wherein the radar signal processing device adjusts a scan period of each of the plurality of radars to match an output synchronization of the radar signal processing device,
wherein the radar signal processing device detects an abnormality of the first radar including a misalignment or a blockage of the first radar based on the decoded first sensing data.

12. The radar signal processing system of claim 11, wherein the first sensing data comprises range-Doppler 2D data, which is data on which Fast Fourier Transform (FFT) is performed on a reception signal.

13. The radar signal processing system of claim 12, wherein the first sensing data is a result of encoding the range-Doppler 2D data using an auto-encoder method.

14. The radar signal processing system of claim 11, further comprising a second radar for generating second sensing data by detecting the surroundings of the vehicle,
wherein the radar signal processing device receives second sensing data from the second radar, decodes the second sensing data using an auto-encoder method, and classifies objects around the vehicle based on the first sensing data and the second sensing data.

* * * * *